(12) United States Patent
Livingston

(10) Patent No.: US 8,733,549 B2
(45) Date of Patent: May 27, 2014

(54) SYSTEM FOR CONTAINING AND/OR TRANSPORTING WIND TURBINE COMPONENTS

(75) Inventor: Jamie T. Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1217 days.

(21) Appl. No.: 11/938,849

(22) Filed: Nov. 13, 2007

(65) Prior Publication Data

US 2009/0120830 A1 May 14, 2009

(51) Int. Cl.
*B65D 81/00* (2006.01)

(52) U.S. Cl.
USPC .......................... 206/499; 200/1.5

(58) Field of Classification Search
USPC ............... 206/523, 499, 448; 220/1.5, 23.85; 410/32, 2, 44; 105/404
See application file for complete search history.

(56) References Cited

U.S. PATENT DOCUMENTS

| | | | | |
|---|---|---|---|---|
| 2,142,518 A | * | 1/1939 | Lavere | 206/514 |
| 2,365,461 A | * | 12/1944 | Fairbanks | 206/372 |
| 2,869,649 A | | 4/1953 | Lux | |
| 3,841,053 A | * | 10/1974 | Weatherhead et al. | 206/514 |
| 3,861,531 A | * | 1/1975 | Bellati | 206/523 |
| 3,896,928 A | * | 7/1975 | Forte | 206/779 |
| 4,053,049 A | * | 10/1977 | Beauvais | 206/318 |
| 4,204,609 A | * | 5/1980 | Kuhn | 220/573.1 |
| 4,295,790 A | * | 10/1981 | Eggert, Jr. | 416/226 |
| 4,389,162 A | | 6/1983 | Doellinger et al. | |
| 4,519,746 A | | 5/1985 | Wainauski et al. | |
| 4,643,646 A | | 2/1987 | Hahn et al. | |
| 4,732,542 A | | 3/1988 | Hahn et al. | |
| 5,628,403 A | | 5/1997 | Thomas et al. | |
| 6,896,134 B2 | * | 5/2005 | Russell et al. | 206/320 |
| 6,983,844 B2 | * | 1/2006 | O'Kane et al. | 206/443 |
| 7,179,059 B2 | | 2/2007 | Sorensen et al. | |
| 7,186,086 B2 | | 3/2007 | Yoshida | |
| 7,374,405 B2 | * | 5/2008 | Wobben | 416/244 R |
| 7,517,198 B2 | * | 4/2009 | Baker et al. | 416/227 R |
| 7,654,799 B2 | | 2/2010 | Eyb | |
| 2003/0175089 A1 | * | 9/2003 | Almind | 410/2 |
| 2004/0060839 A1 | * | 4/2004 | Hergeth | 206/386 |
| 2005/0180833 A1 | * | 8/2005 | Almind | 410/2 |
| 2006/0213145 A1 | * | 9/2006 | Haller | 52/651.01 |
| 2006/0225278 A1 | | 10/2006 | Lin et al. | |
| 2007/0140858 A1 | | 6/2007 | Bakhuis et al. | |
| 2007/0177954 A1 | | 8/2007 | Kootstra et al. | |
| 2007/0189895 A1 | | 8/2007 | Kootstra et al. | |
| 2007/0199847 A1 | * | 8/2007 | Llorente Gonzalez et al. | 206/448 |
| 2007/0289888 A1 | * | 12/2007 | Stangel | 206/430 |
| 2009/0020445 A1 | * | 1/2009 | Koike | 206/319 |

FOREIGN PATENT DOCUMENTS

| | | |
|---|---|---|
| EP | 0319974 A1 | 6/1989 |
| WO | 03076307 A1 | 9/2003 |

* cited by examiner

*Primary Examiner* — Steven A. Reynolds
(74) *Attorney, Agent, or Firm* — James W. Pemrick; Ernest G. Cusick; Frank A. Landgraff

(57) ABSTRACT

A system for containing or transporting wind turbine components is provided. The system includes at least one container for receiving at least a portion of the wind turbine components, and the wind turbine components are arranged within the container in a nested configuration.

20 Claims, 5 Drawing Sheets

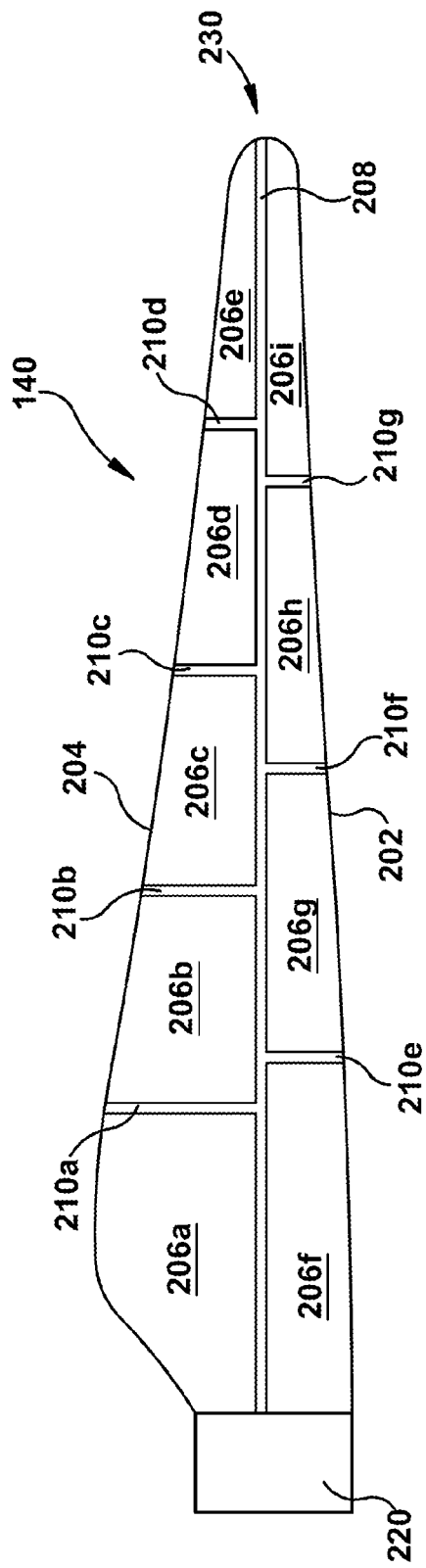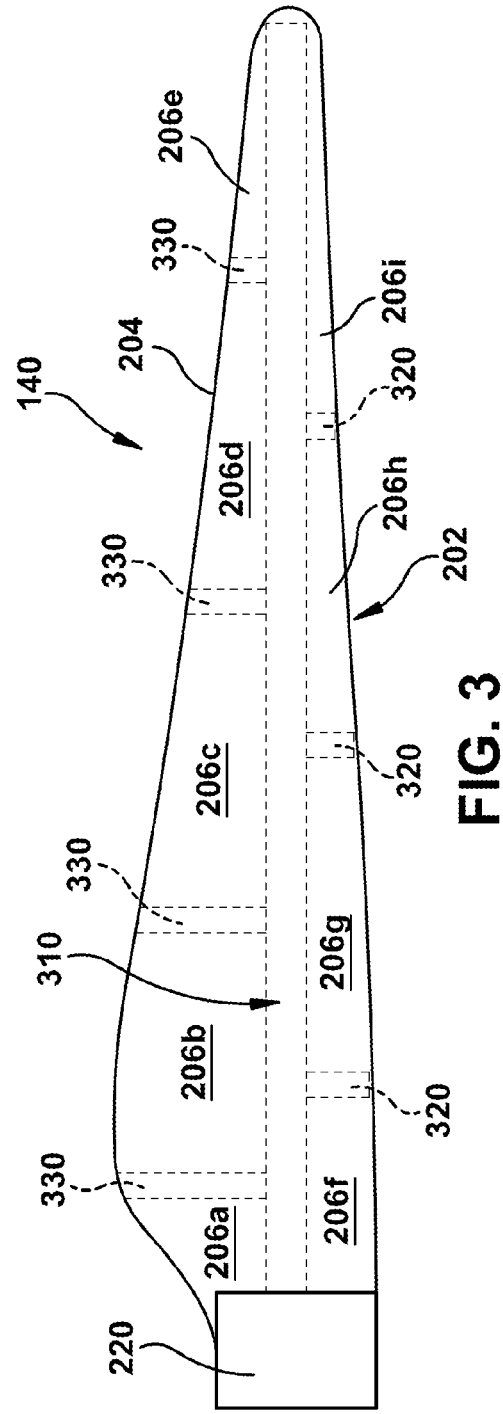

US 8,733,549 B2

SYSTEM FOR CONTAINING AND/OR TRANSPORTING WIND TURBINE COMPONENTS

BACKGROUND OF THE INVENTION

This invention relates generally to transportation containers, and more specifically to systems and methods for containing and/or transporting wind turbine components.

Wind turbines can be comprised of large components, such as, rotor blades, hubs, towers and nacelles. Wind turbine rotor blades are used to generate electrical power from the wind, and can be rather large (e.g., some exceeding up to 200 feet or more in length and up to 12 feet or more in width). Because of their size and/or fragility, some known large rotor blades may be damaged during transportation from where the rotor blades are manufactured to where the rotor blades are used. Rotor blades can be damaged during the loading or unloading from known transportation containers or vehicles. Such damage may degrade performance of the blade.

Wind turbine components may come in a variety of different sizes and shapes. Accordingly, at least some known transportation containers are sized to fit the largest component, which may increase the weight and overall size of transporting smaller components. An alternative to using containers uniformly sized to the largest component is to provide different containers for differently sized components. However, providing differently sized containers may increase the cost and/or difficulty of transporting custom sized containers. Containers of various sizes may present logistical difficulties in that containers of the proper size may or may not be available for each shipment or manufacturing process. Transportation equipment (e.g., overhead cranes, trucks, etc.) may not be designed to handle non-standard size shipping containers.

Shipping containers may be transported using multiple modes of transportation, (e.g., by ship, truck, and/or rail). Many modes of transportation have restrictions on large loads, for example height and/or width limits thereof. For example, when transporting large loads over land, the container height may sometimes be limited to about four meters, or about twelve feet. The height and width limits help to ensure containers clear bridges, overpasses, and other obstructions located on overland transportation routes. Gross vehicle weight limits can also be a challenge. Many primary roads (in the United States) have a maximum weight limit of about 40 tons (or 80,000 pounds) and secondary roads often have weight limits much lower. These limits may increase the difficulty of transporting more than one component in a single container, which may increase the cost of transporting some components and/or increase an impractability of transporting more than one component in a single container. Some wind turbine locations are situated in remote and difficult to access areas. Typically, a truck is used for the final leg of the transportation, and large, heavy, bulky loads can be difficult to navigate along winding or steep roads. For example, a wind turbine located along a winding, steeply graded mountain road can be very difficult to reach with oversize and heavy loads.

Accordingly, a need exists in the art for a more economical and logistically simpler way to store and transport wind turbine components.

BRIEF DESCRIPTION OF THE INVENTION

In one aspect, a system for containing or transporting wind turbine components is provided. At least one container can be used for receiving at least a portion of the wind turbine components. A portion of the wind turbine components can be arranged within the container in a nested configuration.

In another aspect, a system for containing or transporting wind turbine components includes at least one container for receiving at least a portion of the wind turbine components. The container is a standard size shipping container, and at least a portion of the wind turbine components are arranged within the container in a nested configuration.

In yet another aspect, a system for containing or transporting wind turbine components having at least one container for receiving at least a portion of the wind turbine components is provided. The container is a standard size shipping container, and has a length between about twenty feet and about fifty three feet.

BRIEF DESCRIPTION OF THE DRAWINGS

FIG. 2 is a side perspective illustration of a modularly constructed blade, which could be used with the wind turbine of FIG. 1.

FIG. 3 is a side perspective illustration of a modularly constructed blade showing the internal support structure of the blade.

DETAILED DESCRIPTION OF THE INVENTION

As used herein, the term "component" is intended to be representative of any part that comprises the wind turbine. As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts the kinetic energy of wind into mechanical or electrical energy.

Figure 1:
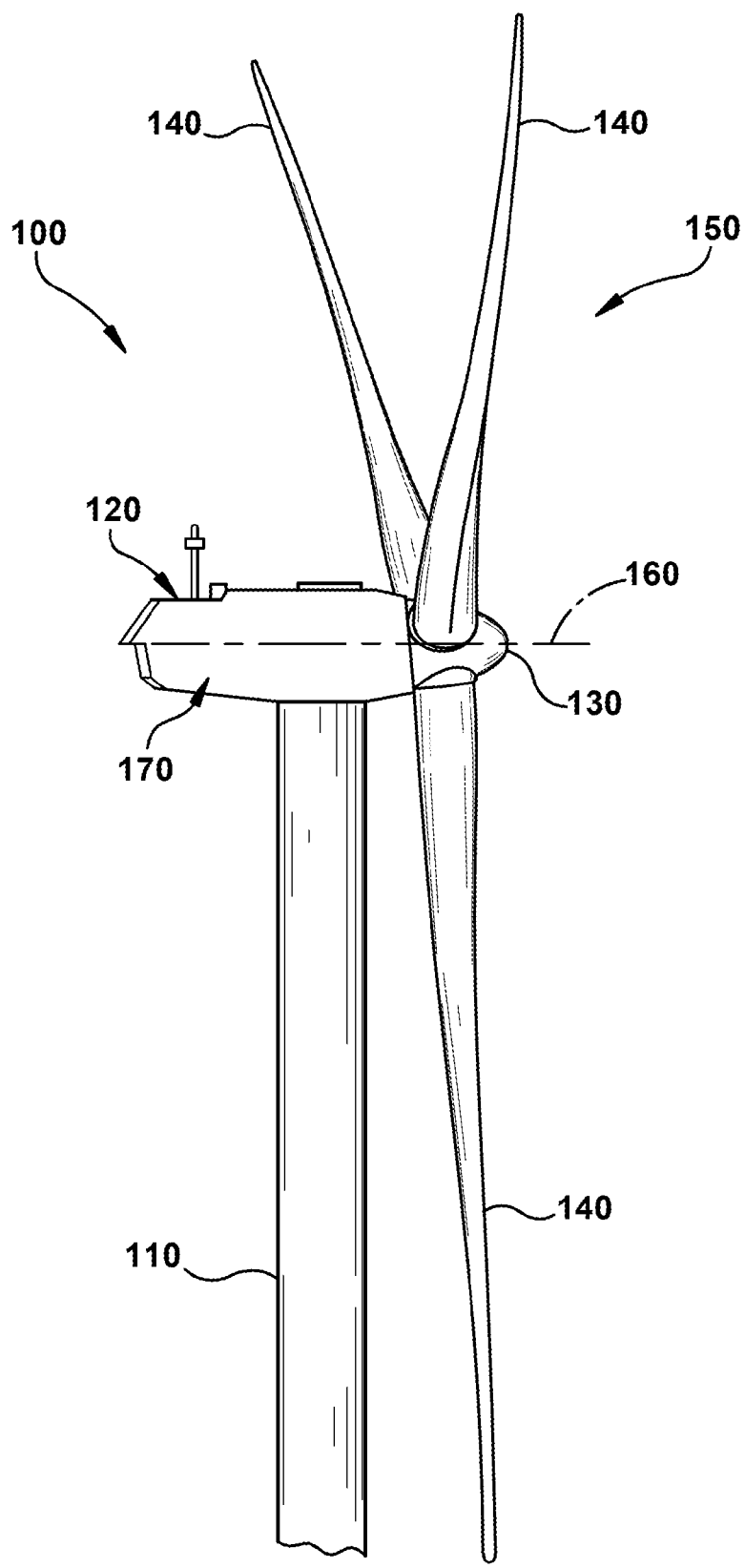
FIG. 1 is a perspective illustration of an exemplary wind turbine.

FIG. 1 is a perspective illustration of an exemplary wind turbine 100. Wind turbine 100 described and illustrated herein can be used for generating electrical power from wind energy. Moreover, wind turbine 100 described and illustrated herein includes a horizontal-axis configuration. However, in some embodiments, wind turbine 100 may include, in addition or alternative to the horizontal-axis configuration, a vertical-axis configuration (not shown). Wind turbine 100 may be coupled to a power grid (not shown) for receiving electrical power therefrom to drive operation of wind turbine 100 and/ or its associated components and/or for supplying electrical power generated by wind turbine 100 thereto. Although only one wind turbine 100 is shown in FIG. 1, in some embodiments a plurality of wind turbines 100 may be grouped together, sometimes referred to as a "wind farm".

Wind turbine 100 comprises a tower 110, nacelle 120, hub 130 and blades 140. The height of tower 110 may range between about 50 to about 100 meters, and the height may also be selected based upon factors and conditions known in the art. Tower heights can vary above or below this range as well. Wind turbine 100 includes a rotor (generally designated by 150) coupled to nacelle 120 for rotation with respect to nacelle 120 about an axis of rotation 160. Rotor 150 includes the hub 130 and blades 140 (sometimes referred to as "airfoils") extending radially outwardly from hub 130 for converting wind energy into rotational energy. Although rotor 150 is described and illustrated herein as having three blades 140, rotor 150 may have any number of blades. Blades 140 may each have any length and/or width. For example, in some embodiments one or more blades 140 can be between about 30 meters in length to about 60 meters or more in length. Blade widths can vary from about 0.5 meters to about 10 meters or more. The length and widths of blades 140 may vary above and/or below these ranges as well.

Despite the illustration of blades 140 in FIG. 1, rotor 150 may have blades of any shape, type and/or configuration, whether such shape, type, and/or configuration is described and/or illustrated herein. One example of another non-limiting type, shape, and/or configuration of blades 140 is a ducted rotor (not shown) having a turbine (not shown) contained within a duct (not shown). Another example of another non-limiting type, shape, and/or configuration of blades is a darrieus wind turbine, sometimes referred to as an "eggbeater" turbine. Yet another example of another non-limiting type, shape, and/or configuration of blades is a savonious wind turbine. Even another example of another non-limiting type, shape, and/or configuration of blades is a traditional windmill for pumping water, such as, but not limited to, four or more bladed rotors having wooden shutters and/or fabric sails. Moreover, wind turbine 100 may, in some non-limiting embodiments, be a wind turbine wherein rotor 150 generally faces upwind to harness wind energy, and/or may be a wind turbine wherein the rotor generally faces downwind to harness energy. Of course, in any embodiments, rotor 150 may not face exactly upwind and/or downwind, but may face generally at any angle (which may be variable) with respect to a direction of the wind to harness energy therefrom.

Wind turbine 100 may include an electrical generator (generally designated by 170) coupled to rotor 150 for generating electrical power from the rotational energy generated by rotor 150. Generator 170 may be any suitable type of electrical generator, such as, but not limited to, a wound rotor induction generator or permanent magnet generator. General operation of the electrical generator to generate electrical power from the rotational energy of rotor 150 is known in the art and therefore will not be described in more detail herein. In some embodiments, wind turbine 100 may include one or more control systems (not shown), actuating mechanisms, and/or sensors (not shown) coupled to some or all of the components of wind turbine 100 for generally controlling operation of wind turbine 100 and/or as some or all of the components thereof (whether such components are described and/or illustrated herein). For example, control system(s), actuating mechanism(s), and/or sensor(s) may be used for, but are not limited to, overall system monitoring and control including, for example, pitch and speed regulation, high-speed shaft and yaw brake application, yaw and pump motor application, and/or fault monitoring. Alternative distributed or centralized control architectures may be used in some embodiments. General operation of wind turbine 100 is known in the art and therefore will not be described in more detail herein.

Referring to FIG. 2, an exemplary embodiment of a modularly constructed blade 140 is illustrated and includes a leading edge 202, a trailing edge 204, and a plurality of blade panels 206*a-i* in bonded association. However, the number of panels illustrated herein is merely exemplary, and not intended to be limiting. Any number of panels is within the scope of the invention. At least one bonding line is representative of a seam or region at which the plurality of blade panels are bonded (i.e. where the bonded associations take place), wherein any adhesive bonding substance necessary to the desired end purpose may be used. Each of the at least one bonding lines can be disposed away from continuous contact with the leading edge 202 and/or the trailing edge 204 of the blade 24. By disposing the at least one bonding line away from continuous contact with the leading or trailing edge, there is less chance for surface abnormality (from mismatching halves during bond process) in these aerodynamically critical areas, improving field performance.

Though field performance of a blade will be improved if the blade comprises only a single bonding line disposed away from continuous contact with the leading edge 202 and/or the trailing edge 204 to bond two blade panels, a blade comprising at least three or more blade panels bonded via bonding lines disposed away from continuous contact with the leading edge 202 and/or the trailing edge 204 will offer additional improvement in the blade's constructability, containment and transportation.

The plurality of blade panels are illustrated as panels 206*a-i*, and the at least one bonding line is illustrated as bonding lines 208 and intersecting bonding lines 210*a-g*. By constructing the blade 140 to include more than two blade panels (nine in the illustration), blade section length is decreased, allowing for easier and less costly transportation of each blade, as well as decreasing molding time per blade, improving molding tool turn-around time. There can be any number of blade panels and there could be an equal number of leading edge and trailing edge panels, or more or less leading edge panels than trailing edge panels. In one preferred embodiment, each panel has an overall length less than the length of a standard size slipping container.

Shipping containers come in various standard sizes, with 20 foot, 40 foot and 45 foot containers being the most common, as well as, 48 foot and 53 foot containers. For example, a 40 foot container is about forty feet long, eight feet wide and eight feet six inches high. Standard size shipping containers have greatly improved the logistics and cost of transportation. Most transportation equipment (e.g., ships, maritime loading/unloading cranes, trucks, railway transport, etc.) is designed to handle these standard size shipping containers. As embodied by aspects of the present invention, a system is provided to take advantage of the presently available standard size shipping containers for transportation of wind turbine components.

Referring to FIG. 3, an illustration of one embodiment of the internal support structure of blade 140 is shown. Blade 140 can comprise a longitudinal spar beam 310, and a plurality of leading edge joint plates 320 and a plurality of trailing edge joint plates 330. FIG. 3 illustrates a specific number of spar beams and joint plates, however, any number of spar beams or joint plates can be used as desired. The spar beams and joint plates may be of one-piece or multi-piece construction.

The leading edge joint plates 320 support the joint between adjacent leading edge panels (e.g., between panel 206*f* and panel 206*g*). Similarly, trailing edge joint plates 330 support the joint between adjacent trailing edge panels (e.g., between panel 206*a* and panel 206*b*). The leading and trailing edge panels may be constructed of graphite composites, aluminum, metal alloys or wood laminates.

Figure 4:
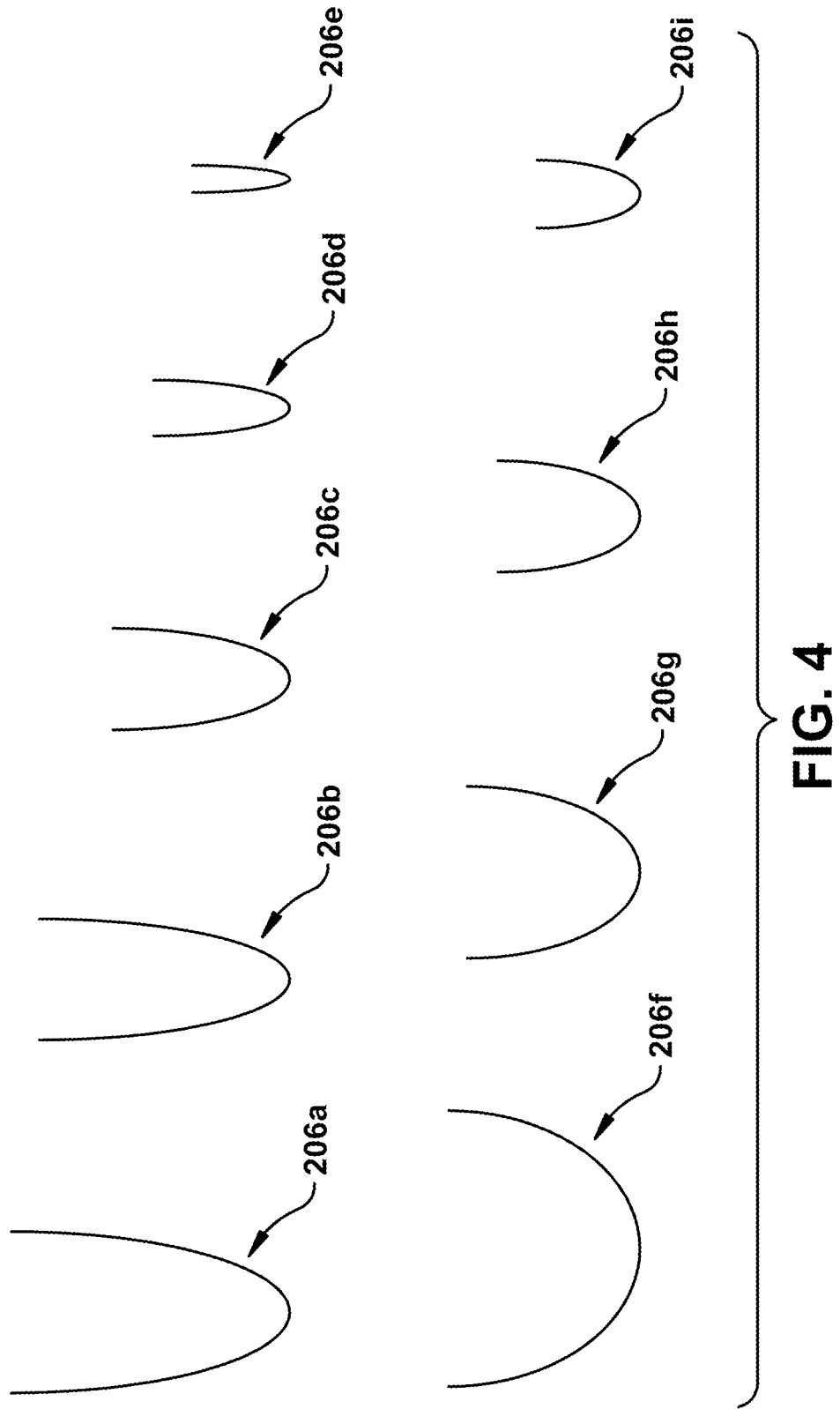
FIG. 4 is an illustration of one embodiment of the various cross-sectional profiles of the blade panels that comprise a wind turbine blade.

Referring to FIG. 4, each panel 206a-i of blade 140 can have a different cross sectional profile, and the profile can be tapered along the length of each individual section. In one embodiment, the profiles are illustrated as shown in FIG. 4. It can be seen that the first panel 206f of the leading edge has a wider profile than the subsequent panel 206g. As shown in this embodiment, each subsequent panel, progressing from the root section 220 to the tip section 230, has a progressively narrower profile. For example, of the leading edge panels, panel 206f is the widest, followed by panel 206g, then panel 206h, and panel 206i is the narrowest. Similarly, of the trailing edge panels, panel 206a is the widest, followed by panel 206b, then panel 206c, followed by panel 206d, and panel 206e is the narrowest of the trailing edge panels.

This progressively narrow profile design for the individual panel components, allows all or a portion of the panels comprising each trailing edge and leading edge to be arranged in a nested configuration. For example, all the leading edge panels 206f-i and/or all the trailing edge panels 206a-e could be stacked together in a nested configuration. Nested can be defined as a set of objects of graduated size that can be stacked together, each fitting within the immediately larger one. For example, a set of graduated bowls can have all the smaller bowls stacked or nested within the largest bowl.

Figure 5:
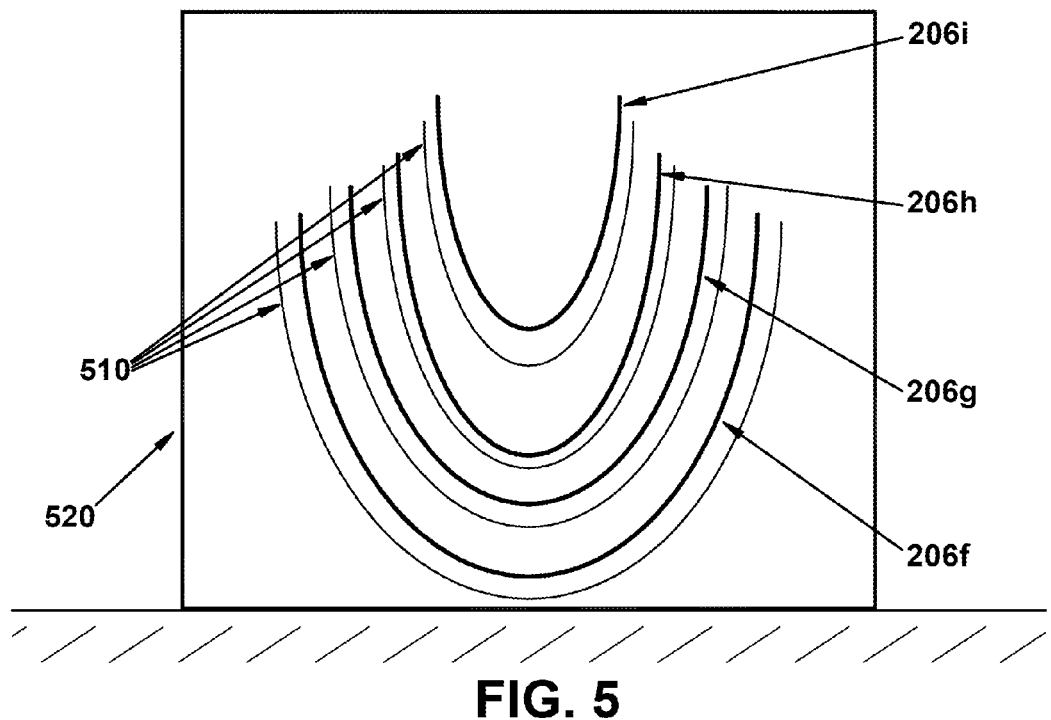
FIG. 5 is a cross-sectional illustration of a shipping container having a plurality of blade panels stored therein, according to one embodiment of the present invention.

FIG. 5 illustrates a standard size shipping container 520 that contains all the leading edge panels 206i-f therein. It may be advantageous to provide optional packing or cushioning material 510 between and around each individual panel. The packing material can protect the individual panels from damage during transport and loading or unloading. The packing material would provide a cushioning effect and could be comprised of natural fiber, rubber, latex, polyurethane, or memory foam materials. It can be seen that the panels are nested together and oriented in a U-shaped arrangement. However, the panels could also be placed in an inverted or upside down U-shaped arrangement as well. Orienting the panels sideways may not be the most preferred arrangement as stresses imposed during transport could damage the panels. In addition, blocking supports (not shown) may also be included within container 520 to further support the nested panels.

For example, a 40 foot slipping container could be used to transport all the panels of a leading or trailing edge. Assuming the blade is 50 meters long, a five panel leading edge section would easily fit within one 40 foot container. Multiple containers could be used to transport the entire blade or portions thereof.

Figure 6:
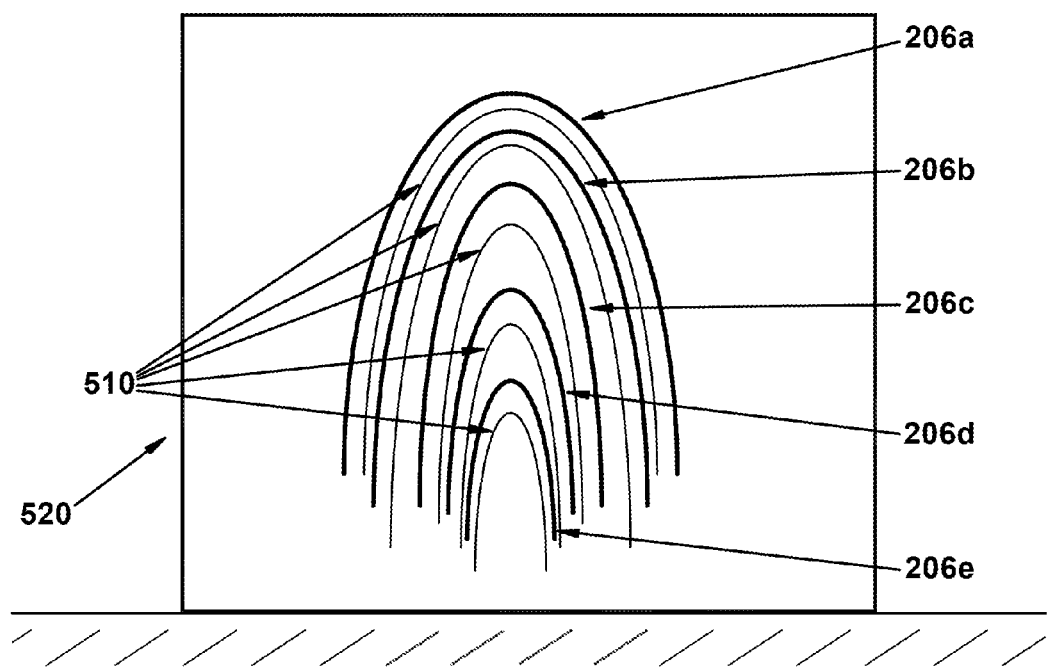
FIG. 6 is a cross-sectional illustration of a shipping container having a plurality of blade panels stored therein, according to one embodiment of the present invention.

FIG. 6 illustrates one embodiment of transporting and containing all the panels of a trailing edge section. Standard size shipping container 520 contains all the trailing edge panels 206a-206e in a nested arrangement. Packing material 510 may be placed between and/or around individual panels. FIG. 6 shows an inverted U-shaped arrangement for transportation. It may be advantageous to have the panels stacked in a "U" shape (FIG. 5) or an inverted "U" shape (FIG. 6) to permit the first panel needed in the assembly process to be the first one available. For example, in FIG. 6 the first panel needed during the assembly process may be panel 206a followed by panel 206b. The arrangement shown in FIG. 6 would permit a more efficient assembly process by immediately exposing the first panel needed in the assembly process. As each panel is removed the next panel needed would be exposed and accessible.

Figure 7:
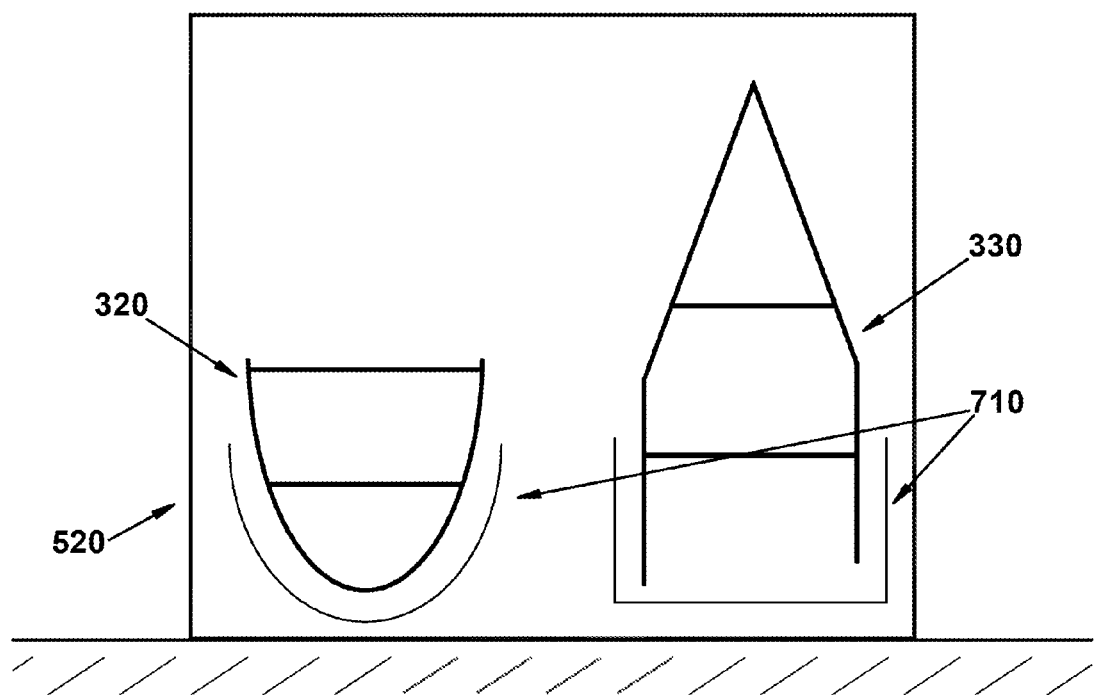
FIG. 7 is a cross-sectional illustration of a shipping container having a plurality of joint plates stored therein, according to one embodiment of the present invention.

FIG. 7 illustrates a standard shipping container 520 that can be used to contain and transport the leading edge joint plates 320 and/or trailing edge joint plates 330. Packing material 710 may be placed below and/or around each joint plate to protect it during transport and the loading/unloading process.

In other embodiments a standard size shipping container may be able to contain a nested stack of leading and/or trailing edge panels and some or all of the joint plates. For example, the leading edge panels could be arranged on one side of container 520 while the joint plates are arranged on the opposite side of the same container. In other embodiments the joint plates could be nested within the panels. One or more root components 220 could also be housed within a standard size shipping container, and the container housing the root may also have room for some or all of the joint plates. One or more spar beams 310 could also be housed within a standard size shipping container, and the container housing the spar beams may also have room for additional components such as, blade panels, joint plates and/or root components.

The above-described and/or illustrated systems are cost-effective and efficient for supporting, containing and/or transporting wind turbine components. More specifically, in some embodiments, the systems support more than one blade or more than one component while being able to be contained within a standard size shipping container, and being sized, shaped, and/or weighted to comply with at least some restrictions on predetermined sized, shaped, and/or weight loads. As such, the systems may facilitate reducing a cost of transporting wind turbine components as compared with at least some known transportation containers and/or methods that only transport one entire component in its final completed form because they otherwise would not comply with at least some restrictions. Such size and/or shape that complies with at least some restrictions on predetermined sized and/or shaped loads may also facilitate transportation using more than one different mode of transportation.

The systems described and/or illustrated herein may also facilitate reducing a cost of transporting wind turbine components by providing packing material or one or more cushions that are adjustable to accommodate a plurality of differently sized and/or shaped components, such that dedicated fixtures of different sizes and/or shapes may not be required for differently sized and/or shaped components. Moreover, the packing or cushioning material may facilitate reducing or eliminating vibrational stresses and/or other forces induced into one or more components, for example during loading, unloading, and/or transportation. As such, the systems described and/or illustrated herein may facilitate reducing or eliminating damage to wind turbine components, for example during loading, unloading, and/or transportation. The packing material, support fixtures or cushions may facilitate a secure coupling between one or more components and the container to facilitate retaining the component(s) within the container and in position during transportation and/or storage of the component(s). Moreover, in some embodiments the components described and/or illustrated herein are nestable and/or stackable, which may facilitate reducing a cost of transporting components because more components can be transported on the same transport means, and/or may facilitate transportation using more than one different mode Although the systems described and/or illustrated herein are described and/or illustrated with respect to wind turbine blades, practice of the systems described and/or illustrated herein is not limited to wind turbine blades. Rather, the systems described and/or illustrated herein are applicable to the transportation and containment of any load.

While the invention has been described in terms of various specific embodiments, those skilled in the art will recognize that the invention can be practiced with modification within the spirit and scope of the claims.

What is claimed is:

1. A system for containing or transporting wind turbine components for a wind turbine, the system comprising:
   a plurality of wind turbine components including at least one modularly constructed blade;
   at least one container, wherein each of the at least one container consists of a single, completely enclosed structure containing all portions of the plurality of wind turbine components contained therein, so that no portion of the plurality of wind turbine components contained within each of the at least one container are external to the at least one container; and
   wherein, at least a portion of said plurality of wind turbine components are arranged within said at least one container in a nested configuration, and wherein smaller wind turbine components are placed within larger wind turbine components.

2. The system of claim 1, wherein said wind turbine components are portions of the at least one modularly constructed blade of said wind turbine, said at least one modularly constructed blade comprised of a plurality of panels, at least some of said panels configured to be arranged in a nested configuration within said at least one container, wherein smaller panels are contained at least partially within larger panels.

3. The system of claim 2, wherein each of said at least one container comprises a standard size shipping container, said standard size shipping container having a length from about twenty feet to about fifty three feet.

4. The system of claim 3, wherein each standard size shipping container has a length chosen from the group comprising:
   about twenty feet, about forty feet, about forty five feet, about forty eight feet, and about fifty three feet.

5. The system of claim 3, said wind turbine components comprising at least one joint plate, said at least one joint plate arranged in said standard size shipping container.

6. The system of claim 1, further comprising:
   said at least one container comprising at least one shipping container, said at least one shipping container having a length between about twenty feet and about fifty three feet.

7. The system of claim 6, wherein said wind turbine components comprise a plurality of blade panels and a plurality of joint plates, and at least some of said blade panels are arranged within the same container as at least some of said joint plates.

8. The system of claim 6, wherein said wind turbine components have a cushion material placed between at least some of said wind turbine components.

9. The system of claim 8, wherein said cushion material comprises at least one of a natural fiber, rubber, latex, polyurethane, and memory foam.

10. A system for containing or transporting wind turbine components comprising:
    a plurality of wind turbine components including at least one modularly constructed blade;
    at least one container, wherein each of the at least one container consists of a single, completely enclosed structure, each of the at least one container containing at least a portion of said plurality of wind turbine components, each of said at least one container being a standard size shipping container; and
    the standard size shipping container housing all portions of the wind turbine components contained therein, so that no portion of the wind turbine components contained within the standard size shipping container are external to the standard size shipping container;
    wherein, at least a portion of said wind turbine components are arranged within said standard size shipping container in a nested configuration, wherein at least a portion of smaller wind turbine components are placed within larger wind turbine components in the standard size shipping container.

11. The system of claim 10, wherein said wind turbine components comprise portions of a blade of a wind turbine, at least some of said portions comprising blade panels.

12. The system of claim 11, wherein a plurality of said blade panels are nested together within the standard size shipping container.

13. The system of claim 11, wherein one or more joint plates are arranged within the standard size shipping container.

14. The system of claim 12, wherein at least a portion of said blade panels and at least one or more joint plates are arranged within the standard size shipping container.

15. The system of claim 11, wherein cushioning material is placed between said wind turbine components.

16. The system of claim 15, wherein said cushioning material comprises at least one of a natural fiber, rubber, latex, polyurethane, and memory foam.

17. A system for containing or transporting wind turbine components comprising:
    a plurality of wind turbine components including at least one modularly constructed blade;
    at least one container, wherein each of the at least one container consists of a single, completely enclosed structure containing at least a portion of said at least one modularly constructed blade, each of the at least one container being a standard size shipping container having a length between about twenty feet and about fifty three feet;
    the standard size shipping container containing all portions of components contained therein so that no portion of the components contained within the standard size shipping container are external to the standard size shipping container.

18. The system of claim 17, wherein at least one spar beam of the at least one modularly constructed blade is contained within said standard size shipping container.

19. The system of claim 17, wherein at least one root section of the at least one modularly constructed blade is contained within said standard size shipping container.

20. The system of claim 17, further comprising:
    a plurality of blade panels, said blade panels arranged within said standard size shipping container in a nested or stacked configuration, and
    wherein the same standard size shipping container also contains at least one of the group comprising: at least one joint plate, at least one spar beam, and at least one root section.

* * * * *